United States Patent [19]
Grant et al.

[11] 3,717,669
[45] Feb. 20, 1973

[54] 2-PHENOXYALKANOIC ACID ESTERS

[75] Inventors: Norman H. Grant, Wynnewood; Harvey E. Alburn, West Chester, both of Pa.

[73] Assignee: American Home Products Corporation, New York, N.Y.

[22] Filed: June 18, 1968

[21] Appl. No.: 737,837

[52] U.S. Cl........260/473 G, 260/326 R, 260/326.3, 260/326 HL, 424/308
[51] Int. Cl............................................C07c 69/76
[58] Field of Search..................................260/473 G

[56] References Cited

UNITED STATES PATENTS

| | | | |
|---|---|---|---|
| 3,494,957 | 2/1970 | Nakanishi | 260/473 |
| 3,448,110 | 6/1969 | Groit | 260/294.3 |
| 2,759,965 | 8/1956 | Begin | 260/473 |
| 2,396,513 | 3/1946 | Jones | 167/45 |

FOREIGN PATENTS OR APPLICATIONS

| | | | |
|---|---|---|---|
| 197,971 | 11/1964 | Sweden | 260/473 |

*Primary Examiner*—Lorraine A. Weinberger
*Assistant Examiner*—R. S. Weissberg
*Attorney*—Joseph Martin Weigman, Dwight J. Potter and Vito Victor Bellino

[57] ABSTRACT

This invention concerns 2-phenoxyalkanoic acid esters which are pharmacologically active as anticholesterol agents.

7 Claims, No Drawings

2-PHENOXYALKANOIC ACID ESTERS

The present invention relates to 2-phenoxyalkanoic acid esters. In particular, this invention concerns 2-phenoxyalkanoic acid alkoxyalkyl esters, 2-phenoxyalkanoic acid succinimido esters and 2-phenoxyalkanoic acid phthalimindo esters which in standard and accepted pharmacological tests have demonstrated biological activity as serum cholesterol lowering agents.

The new and novel compounds within the scope of the present invention are exemplified by the following structural formula:

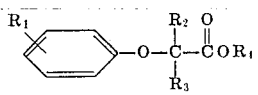

wherein $R_1$ is selected from the group consisting of hydrogen, halogen, lower alkyl and lower alkoxy; $R_2$ and $R_3$ are selected from the group consisting of hydrogen and lower alkyl; and $R_4$ is selected from the group consisting of lower alkoxy(lower)alkyl, succinimido and phthalimido. As employed herein the terms "lower alkyl", "lower alkoxy" and the like are meant to include both branched and straight chain moieties containing from one to about eight carbon atoms. Typical examples of the compounds of this invention are: 2-(p-chlorophenoxy)-2-methylpropionic acid, methoxymethyl ester; 2-(p-chlorophenoxy)-2-methylpropionic acid, succinimido ester; 2(p-bromophenoxy)-2-methylpropionic acid, succinimido ester; and 2-(p-chlorophenoxy)-2-methylpropionic acid, phthalimido ester.

The new and novel 2-phenoxyalkanoic acid, alkoxyalkyl esters of the present invention may be prepared by the process which is hereinafter schematically illustrated:

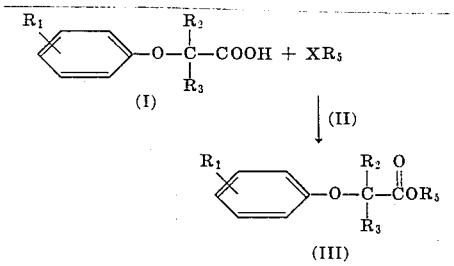

wherein $R_1$, $R_2$, and $R_3$ are defined as above and X is halogen and $R_5$ is lower alkoxy(lower)alkyl. The reaction is effected by admixing an appropriate 2-phenoxyalkanoic acid (I) with a haloalkyl alkylether (II), in the presence of a basic catalyst e.g. triethylamine, in ethyl acetate at about room temperature for a period of about 1 to about 20 hours.

When the reaction is complete, the resulting 2-phenoxyalkanoic acid alkoxyalkyl ester (III) is separated by conventional procedures. For example, the reaction mixture is filtered, washed with water and concentrated.

The new and novel succinimido and phthalimido esters of these 2-phenoxyalkanoic acids may be prepared by the process which is depicted as follows:

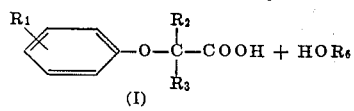

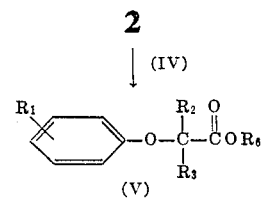

wherein $R_1$, $R_2$, and $R_3$ are defined as above and $R_6$ is succinimido or phthalimido. The reaction is effected by admixing an appropriate 2-phenoxyalkanoic acid (I) with a basic catalyst e.g. triethylamine, in a reaction-inert organic solvent at a temperature below about 0°C. An alkylhalocarbonate e.g. ethylchloroformate is then added to this mixture, the temperature is allowed to equilibrate to about room temperature and the mixture is diluted with ethyl ether. Thereafter, a N-hydroxy succinimide or phthalimide (IV) is added to the reaction mixture with stirring.

When the reaction is complete, the resulting 2-phenoxyalkanoic acid succinimido or phthalimido ester (V) is separated by conventional procedures. For example, the reaction mixture is extracted with an aqueous bicarbonate solution, water and then concentrated to afford the product (V) which can be recrystallized from a suitable solvent e.g. ethyl ether.

The 2-phenoxyalkanoic acid (I) starting materials employed in the above reactions may be prepared by procedures known in the art, for example, the process described by Galimberti, P. and Defranceschi, A. in Gazz. Chim. Ital, 77, 431 (1947) as exemplified in hereinafter Example I. The other reactants e.g. the haloalkyl alkylethers (II) and N-hydroxy succinimide or phthalimide (IV) employed in the above process are commercially available and/or may be prepared by well known chemical procedures. In the above reaction, by the term "reaction-inert organic" solvent is meant any organic solvent that will dissolve the reactants and not interfere with their interaction. Many such solvents will readily suggest themselves to those skilled in the art, e.g. ethyl acetate, chloroform, acetonitrile, dioxan and the like.

The new and novel 2-phenoxyalkanoic acid esters (III) and (V) of the present invention possess valuable pharmacological activity. In particular, these compounds in standard pharmacological procedures demonstrate an ability to reduce serum cholesterol and are useful as anticholesterol agents.

In the pharmacological evaluation of the cholesterol lowering properties of the compounds of this invention the in vivo effects of the compounds are tested as follows:

Male weanling rats are fed a hypercyolesterolemic diet for 3 weeks. Serum cholesterol is determined on 0.01 ml of serum separated from tail blood collected in a capillary tube. Groups of rats with equal average serum cholesterol are given the test compound orally once a day by syringe for 3 days. Serum cholesterol is determined in the morning of the fourth day. Anticholesterol activity is demonstrated by a lowering of the serum cholesterol.

The 2-phenoxyalkanoic acid alkoxyalkyl esters (III), the 2-phenoxyalkanoic acid succinimido esters (V) and the 2-phenoxyalkanoic acid phthalimido esters (V) of this invention in the above test procedure when administered orally at a daily dosage of about 30 to about 50 mg./rat. of animal body weight lower the serum cholesterol level in hypercholesterolemic rats by about 45 to about 80 percent in 3 days.

When the compounds of this invention are employed as serum cholesterol lowering agents they may be administered to warm-blooded animals, e.g., mice, rats, rabbits, dogs, cats, monkeys, etc. alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic.

The dosage of the present anticholesterol agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 40 mg. to about 400 mg. per kilo per day, although as mentioned above variations will occur.

The following examples are given by way of illustration and are not to be construed as limitations of this invention, many variations of which are possible without departing from the scope and spirit thereof.

EXAMPLE I

To 40.0 g. of p-chlorophenol (0.312 moles) dissolved in 382 ml. of acetone (300 g.), there is slowly added 70.0 g. of solid sodium hydroxide and 33.6 ml. of chloroform (50 g.). The resulting mixture is refluxed for 4 hours and then evaporated until a viscous brown liquid begins to solidify. This solid is redissolved in 300 ml. of water with heating, then acidified to about pH 2.0 with concentrated hydrochloric acid (40 ml.). The resulting brown precipitate is filtered, washed with water, dissolved in 600 ml. of 7% sodium bicarbonate, extracted with ether, treated with charcoal, filtered, washed with water and acidified to pH 4.0 with concentrated hydrochloric acid. The resulting solid is filtered, recrystallized from 500 ml. of a 7% sodium bicarbonate solution to afford 2-(p-chlorophenoxy)-2-methylpropionic acid, m.p. 119°C.

Anal. Calc'd for $C_{10}H_{11}O_3Cl$: C, 56.12; H, 5.18; O, 22.43; Cl, 16.57.

Found: C, 55.98; H, 4.94; Cl, 16.77.

EXAMPLE II

To a solution of 12.0 g. of 2-(p-chlorophenoxy)-2-methylpropionic acid in 600 ml. of ethylacetate there is added 4.5 g. of chloromethyl methylether, followed by 7.74 ml. of triethylamine. The mixture is stirred at room temperature for one hour and then allowed to stand overnight. The system is filtered, washed with water, and then concentrated to the oily product which weighs 13.4 g. and is 2-(p-chlorophenoxy-2-methylpropionic acid, methoxymethyl ester.

Anal. Calc'd for $C_{12}H_{15}ClO_4$: C, 55.70; H, 5.80; Cl, 13.72.

Found: C, 55.54; H, 5.86; Cl, 13.43.

In a similar manner, 2-(p-bromophenoxy)propionic acid and chloromethyl ethyl ester are reacted to yield 2-(p-bromophenoxy)propionic acid, ethoxymethyl ester.

EXAMPLE III

Repeating the procedure of Example II to react an appropriate 2-phenoxyalkanoic acid with a haloalkyl alkylether, the following products are obtained:

2-(p-methoxyphenoxy)-2-methylbutyric acid, methoxyethyl ester;

2-ethyl-2-(m-propoxyphenoxy)valeric acid, propoxymethyl ester;

2-methyl-2-(p-toloxy)propionic acid, methoxybutyl ester;

2-methyl-2-phenoxypropionic acid, methoxyheptyl ester;

2-(p-fluorophenoxy)acetic acid, pentoxymethyl ester;

2-(m-ethoxyphenoxy)-2-propylcaproic acid, hexoxypropyl ester;

2-(o-chlorophenoxy)-2-methylpropionic acid, methoxypropyl ester;

2-(p-iodophenoxy)-2-methylpropionic acid, ethoxymethyl ester;

2-(p-ethylphenoxy)-2-methylvaleric acid, methoxymethyl ester; and 2-(m-butylphenoxy)-2-methylpropionic acid, ethoxymethyl ester.

EXAMPLE IV

A solution of 10.73 g. of 2-(p-chlorophenoxy)-2-methylpropionic acid and 7 ml. of triethylamine in 50 ml. of methylene chloride is chilled to 0°C. There is then added 5 ml. of ethylchloroformate, and the system is stirred and warmed to room temperature. After 1 hour there is added 50 ml. of ethyl ether, and the system is filtered. The filtrate is adjusted to 100 ml. by addition of ethyl ether and half of this is then stirred with 2 g. of N-hydroxysuccinimide at room temperature. The mixture is extracted three times with 100 ml. portions of 0.1 M $K_2HPO_4$ and then with 10 ml. of water. The ether layer is evaporated to an oil, which solidifies overnight. This product is recrystallized from ethyl ether, giving 2.0 g. of 2-(p-chlorophenoxy-2-methylpropionic acid, succinimido ester.

Anal. Calc'd for $C_{14}H_{14}ClNO_5$: C, 53.9; H, 4.49; N, 4.49.

Found: C, 53.8; H, 4.44; N, 4.25.

In a similar manner, 2-(p-bromophenoxy)-2-methylpropionic acid is reacted with N-hydroxysuccinimide to yield 2-(p-bromophenoxy)-2-methylpropionic acid, succinimido ester.

EXAMPLE V

A solution of 5.3 g. of 2-(p-chlorophenoxy)-2-methylpropionic acid and 3.5 ml. of triethylamine in 25 ml. of methylene chloride is chilled to 0°C. There is then added 2.5 ml. of ethylchloroformate, and the system is stirred and warmed to room temperature. After 2 hours there is added 25 ml. of ethyl ether, and the system is filtered. The filtrate is adjusted to 50 ml.

by addition of ethyl ether and half of this is then stirred with 1.0 g. of N-hydroxyphthalimide at room temperature. The mixture is extracted three times with 50 ml. portions of 0.1 M $K_2HPO_4$ and then with 10 ml. of water. The ether layer is evaporated and the residue recrystallized from ethyl ether, giving 2-(p-chlorophenoxy)-2-methylpropionic acid, phthalimido ester.

EXAMPLE VI

When the procedure of Examples IV – V is repeated to react an appropriate 2-phenoxyalkanoic acid with N-hydroxysuccinimide or N-hydroxyphthalimide the following compounds are obtained:

2-(o-chlorophenoxy)-2-methylpropionic acid, succinimido ester;

2-(p-iodophenoxy)-2-methylpropionic acid, phthalimido ester;

2-(p-ethylphenoxy)-2-methylvaleric acid, succinimido ester;

2-(m-butylphenoxy)-2-methylpropionic acid, succinimido ester;

2-methyl-2-phenoxypropionic acid, phthalimido ester;

2-(p-fluorophenoxy)acetic acid, succinimido ester; and 2-(m-ethoxyphenoxy)-2-propylcaproic acid, phthalimido ester.

What is claimed is:

1. A compound selected from the group consisting of those having the formula

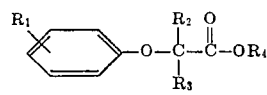

wherein $R_1$ is a single substituent selected from the group consisting of halogen, lower alkyl and lower alkoxy; $R_2$ is selected from the group consisting of methyl, ethyl and propyl; $R_3$ is selected from the class consisting of methyl, ethyl, propyl and butyl and $R_4$ is lower alkoxy (lower) alkyl.

2. A compound as described in claim 17 which is: 2-(p-chlorophenoxy)-2-methylpropionic acid, methoxymethyl ester.

3. A compound as described in claim 1, which is: 2-(p-methoxyphenoxy)-2-methylbutyric acid, methoxyethyl ester.

4. A compound as described in claim 1 which is: 2-ethyl-2-(m-propoxyphenoxy)valeric acid, propoxymethyl ester.

5. A compound as described in claim 1 which is: 2-methyl-2-(p-toloxy)propionic acid, methoxybutyl ester.

6. A compound according to claim 1 wherein $R_1$ is halogen.

7. A compound according to claim 6 wherein said halogen is in the para position.

* * * * *

PO-1050
(5/69)

UNITED STATES PATENT OFFICE
CERTIFICATE OF CORRECTION

Patent No. 3,717,669            Dated February 20, 1973

Inventor(s) Norman H. Grant and Harvey E. Alburn

It is certified that error appears in the above-identified patent and that said Letters Patent are hereby corrected as shown below:

Claim 2, line 1 (column 6), change "17" to --1--.

Signed and sealed this 20th day of November 1973.

(SEAL)
Attest:

EDWARD M. FLETCHER, JR.            RENE D. TEGTMEYER
Attesting Officer                     Acting Commissioner of Patents